United States Patent [19]
Yocum

[11] Patent Number: 5,502,877
[45] Date of Patent: Apr. 2, 1996

[54] ELECTRICAL UTENSIL CORD-ANCHORING DEVICE

[76] Inventor: Michael S. Yocum, P.O. Box 536, Alpine, N.J. 07920

[21] Appl. No.: 118,144

[22] Filed: Sep. 9, 1993

Related U.S. Application Data

[62] Division of Ser. No. 951,787, Sep. 28, 1992, Pat. No. 5,396,684.

[51] Int. Cl.⁶ ................................................. B65D 63/00
[52] U.S. Cl. ................................ 24/16 PB; 24/30.5 P
[58] Field of Search ...................... 24/16 R, 16 PB, 24/30.5 R, 30.5 P, 17 AP; 248/74.3

[56]  References Cited

U.S. PATENT DOCUMENTS

| | | | |
|---|---|---|---|
| 1,945,932 | 2/1934 | Caley | 24/17 AP |
| 2,292,140 | 8/1942 | Lofgren . | |
| 2,350,048 | 5/1944 | Kobler et al. . | |
| 2,383,031 | 8/1945 | Wilson . | |
| 3,197,830 | 8/1965 | Hoadley | 24/16 PB |
| 3,275,969 | 9/1966 | Sheeran . | |
| 3,556,575 | 1/1971 | Farkas | 24/16 PB X |
| 4,182,005 | 1/1980 | Harrington . | |
| 4,229,924 | 10/1980 | Teachout, Sr. | 24/16 R X |
| 4,910,835 | 3/1990 | Carpenter . | |
| 4,991,265 | 2/1991 | Campbell et al. . | |
| 5,024,402 | 6/1991 | Hamel | 24/16 PB X |
| 5,133,671 | 7/1992 | Baghosian | 24/16 PB X |

FOREIGN PATENT DOCUMENTS

| | | | |
|---|---|---|---|
| 1075876 | 10/1954 | France | 24/30.5 P |
| 1309873 | 10/1962 | France | 24/16 PB |

*Primary Examiner*—James R. Brittain
*Attorney, Agent, or Firm*—William T. Hough

[57] ABSTRACT

In a preferred embodiment, a device for securing an electrical elongated cord in a compacted state, of an electrical utensil, in an anchored state intermittently anchored to the electrical utensil is an elongated elastic strip having opposite flat faces extending between opposite ends, with a large hole (through-space) in one end and with an elongated slit in the other end, with spaced-apart apertures located one at each of opposite ends of and continuous with opposite ends ends of the elongated slit, with narrow strip width at the other end and along a intermediate-portion between the one and other ends, and with a broader width at the other end embodying the large hole, and with at-least one barb-shaped intermittent enlarged portion along opposite edges of the intermediate portion, and with enlarged widths on each of opposite edges of the strip aligned with each of the spaced-apart apertures, and the remaining end of the strip having diminishing width suitable for insertion through the larger hole, for practice of the method of rolling up or wrapping the cord around a utensil structure in a thereby cord-compacted state followed by securably wrapping the elongated strip around the compacted cord followed by insertion of the one end though the large hole, tightening, and anchoring the slit-forming structure around a protuberance or elongated portion of the electrical utensil.

1 Claim, 4 Drawing Sheets

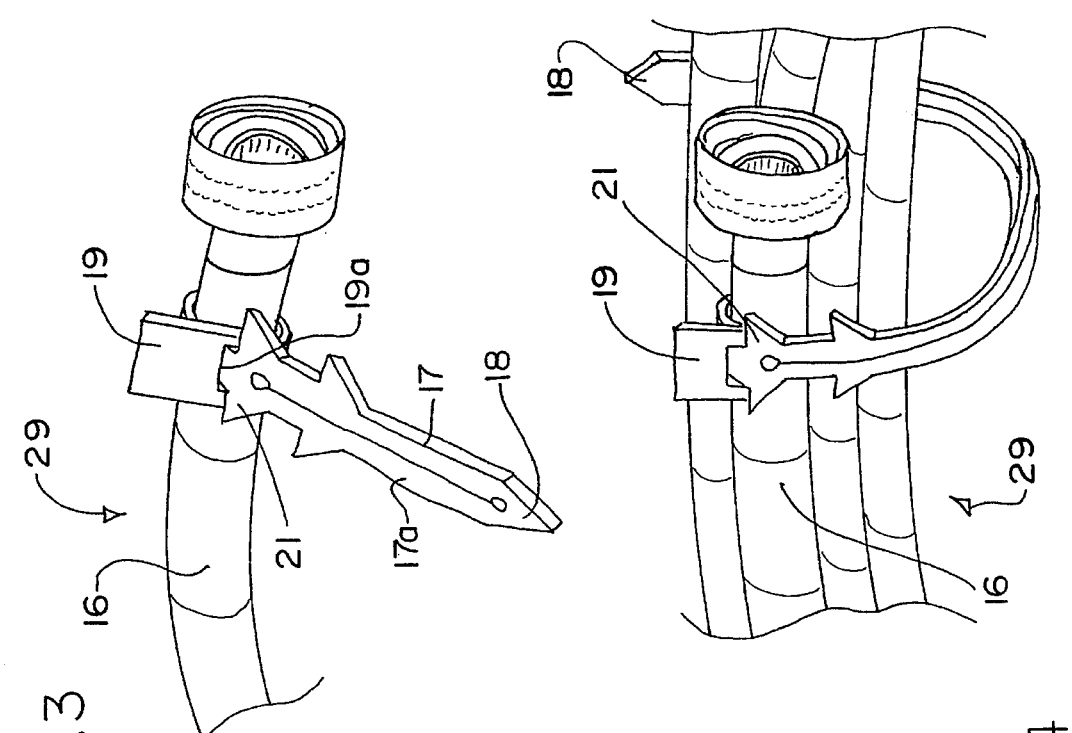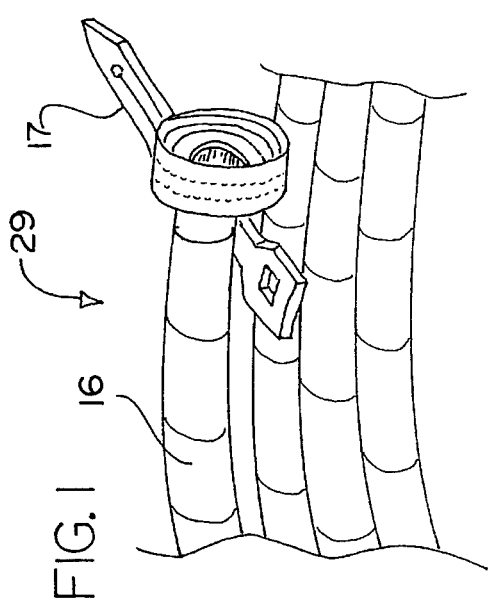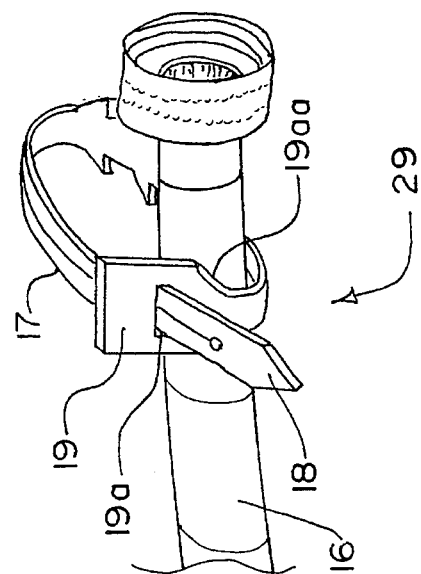

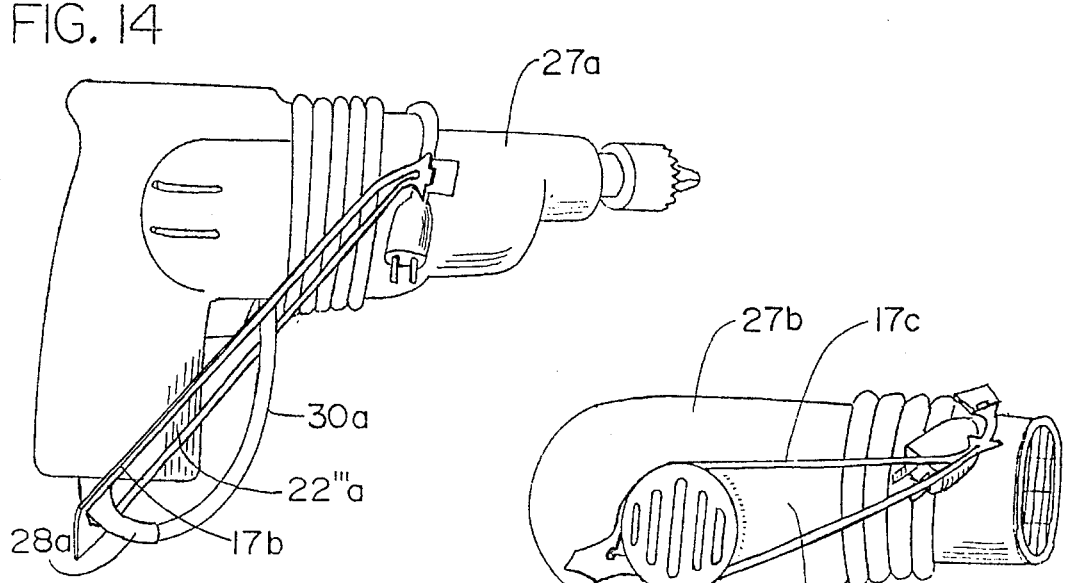
FIG. 14
FIG. 15
FIG. 16
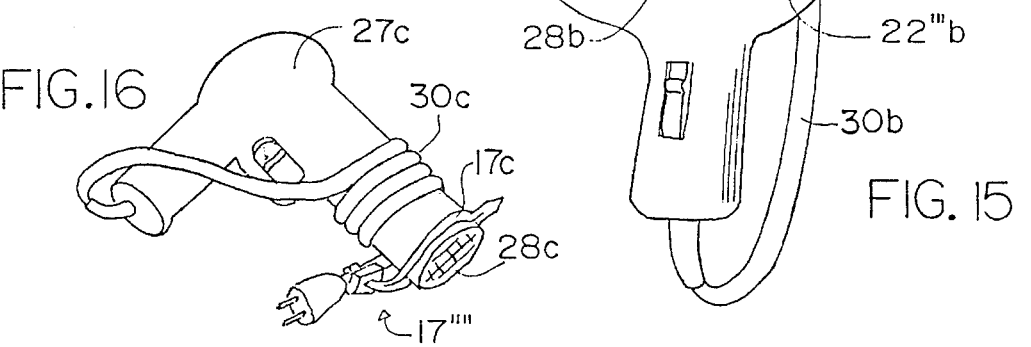
FIG. 17
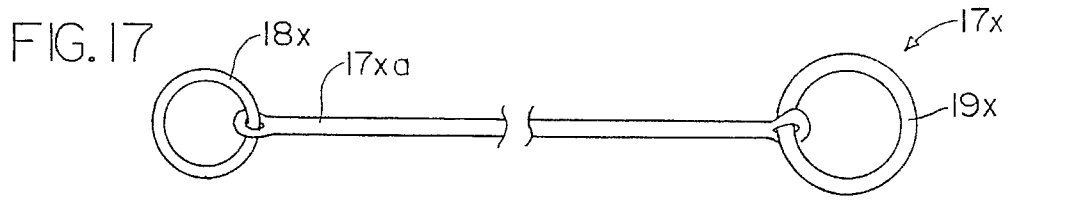
FIG. 18
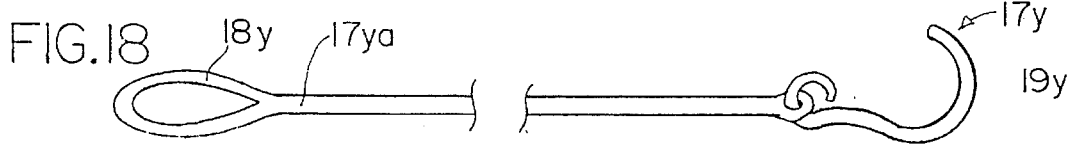
FIG. 19
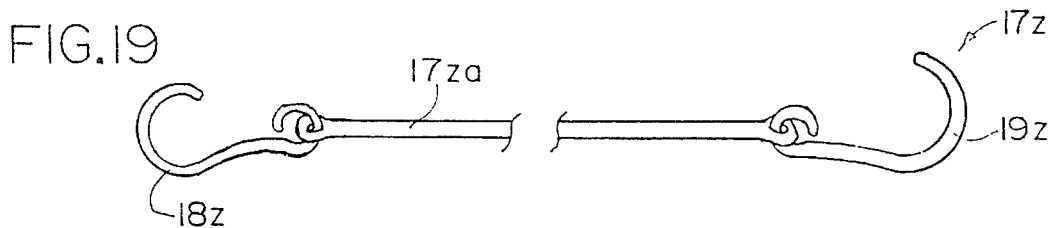

ELECTRICAL UTENSIL CORD-ANCHORING DEVICE

This is a division of application Ser. No. 07/951,787 filed Sep. 28, 1992 now U.S. Pat. No. 5,396,684.

THE SPECIFICATION

This invention relates to typically an electrical utensil or appliance having typically an electrical elongated cord or the like extending therefrom with an end-mounted electrical plug or other attachment structure, and to a portable device for the intermittent compacting and anchoring thereof.

PRIOR ART

While no relevant prior art was located in a patentability search of United States Class 439, subclass 501, and Class 24, subclasses 128, 129 (all), 130, and 16PB, the following patents of mere interest were located. Campbell et al. U.S. Pat. No. 4,991,265 granted Feb. 12, 1991 discloses solely a special tying member having an elongated member with serially-spaced locking buttons lockable within a wedge-shaped slotted member through which the elongated member is threadable in order to make possible engagement of alternately any one of the locking buttons. The Sheeran U.S. Pat. No. 3,275,969 issued Sep. 27, 1966 is directed to another button-engaging device with a button engageable within a slotted button-receiving hole in an elongated strap having its opposite end 1 fastened by plug-mounted button-receiving receptacle for securing the plug to the strap-gripped folded cord. Lofgren U.S. Pat. No. 2,292,140 issued Aug. 4, 1942 discloses a double-slotted member for latching together opposite ends of an electrical cord that is mounted between opposite posts. Carpenter U.S. Pat. No. 4,910,835 issued Mar. 27, 1990 discloses a strap having mateable male and female members on opposite ends of the strap, by which an insert cord-loop is mountable on the male member cross-bar. Harrington U.S. Pat. No. 4,182,005 issued Jan. 8, 1980 discloses a mounted clamp for securing a circularly wound electrical cord, with a separate cord channel carrying the electrical plug, the clamp being intermittently adjustable to different sizes. Wilson U.S. Pat. No. 2,383,031 granted Aug. 21, 1945 discloses an electric razor having a grooved casing for winding thereon the electric cord extending therefrom, and the plug has a reverse side thereof mountable within a recess which conforms with the cutting edge of the razor casing arranged to fit snugly thereon. Kobler et al. U.S. Pat. No. 2,350,048 granted May 30, 1944 discloses an electric shaver having spaced-apart connecting pins at one end thereof, and wrapping grooves at the other end, enabling wrapping of the electric cord between and around opposite end of the shaver. None of these patents relate to the structure and function of the present inventive device, discussed in the following background discussion.

BACKGROUND

Externally powered electrical and/or electronic appliances or utensils are typically equipped with an elongated electrical or power cord and plug thereof, adapted for plug connection to and removal from a power source electric receptacle. The cord is typically of sufficient length to allow function, but is typically long enough to cause difficulties associated with entangling and attempted storage after discontinued use and disconnection from the electrical receptacle. Invariably typical solutions for securing the cord result in wrapping or attempting to wrap the cord back around the appliance itself—as typical of some of the foregoing noted prior art patents. The ultimate solution heretofore has been to merely wad the cord in disoriented positions into a close proximity to the appliance or electrical utensil, or looping the cord lariot style as close to the electrical utensil to the extent that space allows. Garbage bag tying-plastic coated wires twisted-together, or otherwise fastened secured-together loops of the cord, in the manner of use of the device of above-noted Campbell patent and Sheeran patent, and Harrington patent or alternatively folding by looping back and forth between spaced-apart members such as the above-noted Lofgren patent and the Kobler et al. patent. There are other electrical appliances (electrical utensils) that have associated storage-facilitating structure such as the above-noted Kobler et al. patent and the above-noted Wilson patent.

Problems heretofore associated with prior approaches such as those above-noted are as follow. A cord with a notch or recesses is a rather precise device that fails to function if the cord is not pushed fully into the concavity, or after eventual wear, such that it easily falls out, not being a reliable securing nor anchoring mechanism. Elongated heretofore non-elastic straps are not adapted to serve more than one situation having its specific restricted dimensions, not being applicable to random nor diverse shape or thicknesses of electrical cords and/or electrical utensils from which they extend, nor to cords of longer lengths nor thicknesses when coiled or otherwise compacted, whereby it/they cannot be adequately enveloped if at all. Plastic coated wires for securing tops of garbage bags are not cosmetically attractive, and do not come in varying lengths, as well as being typically adapted for wrapping around a narrow neck or "thin" grouping or bunch—not adaptable to the ends and purposes to which the present invention is directed. Also, prior art structure(s) of fixed (permanent) and unyielding non-elastic material(s) have the inherent limitations of their finite limited shape and dimension not adaptable to varying-requirements and demands of diverse electrical utensils (appliances), and accordingly impossible to utilize for the diverse purposes and objects to which the present invention is directed and capable. Additionally, many of the prior art devices art devices are too large and/or awkward for potential use in any of diverse other situations other that the single device or electrical utensil(appliance) for which it was/is specifically designed, not applicable to the multiple alternate uses and objects of the present invention. Additionally, many of the prior art devices are too complex/complicated in both manufacture and use and accordingly also expensive to manufacture and in the ultimate cost to the consumer, and/or break easily, and/or limited in workable-place(s) of securing (anchoring) the cord or bundle thereof, and/or require too much thinking and/or maneuvering by the intended user—the user thereof typically being impatient and in a hurry to tie-down with great speed, not being prone to utilize difficult or arduous and/or prolonged procedure, typical of most if not all prior art devices. It is also noteworthy that most electrical utensils (appliances) are devoid of or missing any device or mechanism for bundling and/or storing the dangling electric cord during or after use thereof. It is redundant to note that conventional tying devices such as utilized for garbage bags and for use around a hose to lock-on the hose onto a rigid male spout or inlet or outlet tube, have irreversible locks removable solely by cutting-off or otherwise destroying—not being adapted for intermittent locking nor anchoring use, apart from other limitations above-noted.

Accordingly, typically externally powered appliances (utensils) available and sold today, have elongated electrical power cords that have an electric plug at the end thereof, which cord and plug when not in use present(s) a continuing problem of anchoring for and/or during intermittent storage prior to next use thereof. To the foregoing problems, difficulties, disadvantages and inherent limitations, objects of the present invention are as follow.

OBJECTS OF THE INVENTION

Objects of the present invent/on include the overcoming and/or avoiding of problems and/or difficulties above-noted.

Another object is to obtain an anchoring device for an electrical utensil (appliance) having an attached electrical cord and plug thereof on a free end thereof, for intermittent anchoring the cord, irrespective of size in thickness and/or length of either and/or both the cord and/or the electrical utensil itself.

Another object is to obtain such intermittent anchoring device adapted for use with any of a plurality of potent/ally diverse cord(s) and/or electrical utensil(s) of varying sizes(s) and/or shape(s).

Another object is to obtain an unattached portable intermittent anchoring device adapted for easy relatively permanent attachment to an electrical utensil's cord before, during and after intermittent anchoring of the electrical utensil's cord onto an elongated portion and/or protuberance of the electrical utensil.

Another object is to obtain an intermittent portable anchoring device adaptably stretchable and/or expandable to accommodate varying dimension(s) of different size(s) of electrical utensil(s) and/or elongated portion(s) and/or protuberance(s) thereof.

Another object is to obtain a light-weight intermittent anchoring device adapted for both substantially permanent anchoring on any of optional different electrical utensil(s) and/or electrical cord(s) thereof, and concurrently adaptable for intermittent repeated anchoring of the electrical cord(s) to the electrical utensil(s) and/or elongated portion(s) and/or protuberance and/or compacted cord(s) thereof.

Another object is to obtain an expandable and/or stretchable anchoring device adapted to be durable during the expanded state during the process of mounting and/or during enduring a stretched and/or expanded state thereof during prolonged mounting, and/or when expanded and/or stretched to fit on and/or around the electrical utensil(s) and/or elongated portion and/or protuberance thereof and/or on or around the utensil's compacted cord prior to and/or during the mounting and/or anchoring thereof.

Another object is to obtain preferred shape(s) of the inventive anchoring device improving ease of mounting and/or to facilitate retension of tightness during securing and/or anchoring of the cord during intermittent use thereof.

Another object is to obtain an anchoring device having one or more of the preceding advantages and characteristics, of simple and inexpensive construction, making possible low cost of sale to the consuming public.

Another object is to obtain a novel method of securing and/or anchoring an electrical utensil (apparatus) cord that is affixed and extending from the electrical utensil (apparatus).

Other objects become apparent from the preceding and following disclosure.

SUMMARY OF THE INVENTION

Broadly the invention includes closely interrelated both method and device, for accomplishing preceding objects.

In a broad statement of the inventive method, the method provides for intermittently securably anchoring on an electrical utensil or other support structure having at-least one of an elongated portion or a protuberance, and an elongated cord or elongated tubular structure, such as typically an electrical utensil's electrical elongated cord carrying an electrical plug on a free end of the electrical utensil's electrical elongated cord. Broadly this method includes, in combination, a) first positioning the electrical elongated cord or elongated tubular structure into an unanchored compacted state and position as a compacted cord and said free end or as a compacted tube. Next, included is b) thereafter employing a portable wrapping structure(s) and mechanism(s) thereof for intermittently securing at-least one of the compacted cord or the extended free end thereof, or the compacted tube to at-least one of the protuberance and an elongated portion such as that of an electrical utensil; in the practice of these foregoing steps, the steps are achievable when the wrapping structure(s) and mechanism(s) thereof includes an elongated elastic element having at-least one structure providing through-space through each of one end of the elongated elastic element and a remaining opposite end of the elongated elastic element and an intermediate mid-portion between the one end and the remaining opposite end, and when the remaining opposite end and the mid-portion are serially insertable through the through-space at the one end. The employing includes a step(s) of wrapping the elongated elastic element circumscribingly around at-least one of the compacted cord and the utensil's cord's free end. Also included as a part of this method, is c ) serially inserting the remaining opposite end and the intermediate mid-portion through the through-space at the one end sufficiently to form a loop having a circumference around at-least one of the compacted cord and the free end. Also included as a part of this method, is d) tightening the elongated elastic element sufficiently to reduce the circumference. Also included as a part of the method is e) thereafter intermittently anchoring the remaining opposite end securably around a at-least one of the protuberance and the elongated portion with or without and the cord or tube in a compacted state, such that typically at-least the elongated portion and/or protuberance is/are positioned within the through-space at the remaining opposite end.

In a separate but interrelated embodiment of the invention, there is provided a utensil cord portable anchoring device directed toward the end of securably anchoring an electrical utensil's electrical elongated cord carrying an electrical plug on the electrical utensil's electrical elongated cord's free end. This device includes as a combination, a portable wrapping structure(s) and mechanism(s) thereof for intermittently securing an electrical utensil's electrical elongated cord to at-least one of a protuberance or elongated portion of the electrical utensil. The portable wrapping structure(s) and mechanism(s) thereof includes an elongated elastic element having one end thereof and a remaining opposite end thereof and an intermediate mid-portion therebetween and having at-least one structure providing separate spaced-apart through-spaces. The separate spaced-apart spaces include a first through-space through the one end and a separate second through-space through the remaining opposite end with the intermediate mid-portion therebetween. At-least one of (i) the first through-space and (ii) the remaining opposite end and mid-portion is of a size such that the remaining opposite end and the mid-portion are insertable and passable through the first through-space, and at-least one of the second through-space. Also, the protuberance or the elongated portion is of a size such that the second through-space is receivable of at least one of the protuberance and the elongated portion of the electrical utensil sufficiently that the remaining opposite end is intermittently anchorable thereon. The one end and the intermediate midportion are of combined sufficient length to wrap around at-least one of a) the utensil's electrical elongated cord when the utensil's electrical elongated cord is in the compacted state and b) the electrical utensil's electrical elongated cord's free end.

In a first preferred alternate preferred method as an improvement on the broad method, this embodiment including the limitations of the first broad device of the preceding paragraph employing the preceding described utensil cord portable anchoring device, for intermittently securably anchoring on an electrical utensil having at-least one of a protuberance and an elongated portion, an electrical utensil's electrical elongated cord carrying an electrical plug on a free end of the electrical utensil's electrical elongated cord. This preferred method includes in combination, the following: a) first positioning the electrical elongated cord in an unanchored compacted state and position as a compacted cord including the free end; b) thereafter employing a portable wrapping structure(s) and mechanism(s) thereof for intermittently securing the compacted cord to at-least one of the protuberance and the elongated portion of the electrical utensil. The employing step includes wrapping the elongated elastic element circumscribingly around at-least one of the compacted cord and the utensil's cord's free end; c) serially inserting the remaining opposite end and the intermediate mid-portion through the first through-space sufficiently to form a loop having a circumference around at-least one of the compacted cord and the cord free-end; d) tightening the elongated elastic element sufficiently to reduce the circumference, and e) thereafter intermittently anchoring the remaining opposite end securably around at-least one of the protuberance and the elongated portion such that the protuberance or the elongated portion is positioned within the second through-space.

This embodiment is directed to a second preferred utensil cord portable anchoring device for securable anchoring an electrical utensil's electrical elongated cord carrying an electrical plug on the electrical utensil's electrical elongated cord's free end; the embodiment includes in combination: a portable wrapping structure(s) and mechanism(s) thereof for intermittently securing an electrical utensil's electrical elongated cord to at-least one of a protuberance or elongated portion of the electrical utensil. The portable wrapping structure(s) and mechanism(s) thereof including an elongated elastic element having one end thereof and a remaining opposite end thereof and an intermediate mid-portion therebetween. This embodiment additionally has at-least one structure providing separate spaced-apart through-spaces including a first through-space through the one end and a separate second through-space through the remaining opposite end with the intermediate mid-portion therebetween. The one end and the intermediate mid-portion are of combined sufficient length to wrap around at-least one of a) the utensil's electrical elongated cord when the utensil's electrical elongated cord is in the compacted state and b) the electrical utensil's electrical elongated cord's free end. The one end being sufficiently elastic to receive the remaining opposite end and the mid-portion through the first through-space and the remaining opposite end are sufficiently elastic to receive through the second through-space, at least one of the protuberance and the elongated portion sufficiently to intermittently anchor the remaining opposite end thereof.

In an alternate third preferred embodiments the method employs a second preferred embodiment of the utensil cord portable anchoring device of the preceding paragraph. The method is for intermittently securably anchoring on an electrical utensil having at-least one of a protuberance and an elongated portion, an electrical utensil's electrical elongated cord carrying an electrical plug on a free end of the electrical utensil's electrical elongated cord, in a method combination as follows: a) first position the electrical elongated cord in an unanchored compacted state and position as a compacted cord including the free end; b) thereafter employ a portable wrapping structure(s) and mechanism(s) thereof for intermittently securing the compacted cord to at-least one of the protuberance and the elongated portion of the electrical utensil; the employing includes wrapping the elongated elastic element circumscribingly around at-least one of the compacted cord and the free end; c) serially insert the remaining opposite end and the intermediate mid-portion through the first through-space sufficiently to form a loop having a circumference around at-least one of the compacted cord and the free-end; d) tighten the elongated elastic element sufficiently to reduced the circumference; and e) thereafter intermittently anchor the remaining opposite end securably around at-least one of the protuberance and the elongated portion such that the protuberance or the elongated portion is positioned within the second through-space.

In an alternate fourth preferred embodiment as an improvement on the above-identified second preferred embodiment, the utensil cord portable anchoring device includes the utensil and the utensil's electrical elongated cord and electrical plug thereof.

In an alternate fifth preferred embodiment as an improvement on the second preferred embodiment, the utensil cord portable anchoring device includes at least the one structure forming at the remaining opposite end the second through-space substantially as an elongated slit extending from the remaining opposite end toward the intermediate mid-portion. The slit has opposite proximal and distal ends. The proximal end is spaced-away from the intermediate mid-portion and the distal end is adjacent the intermediate mid-portion.

In an alternate sixth preferred embodiment as an improvement on the fifth preferred embodiment, the utensil cord portable anchoring device includes the one structure forming a through-space opening at each of the opposite proximal and distal ends.

In an alternate seventh preferred embodiment as an improvement on the sixth preferred embodiment, the utensil cord portable anchoring device, the elastic element has substantially flat opposite upper and lower faces having a predetermined first width.

In an alternate eighth preferred embodiment as an improvement on the seventh preferred embodiment, the utensil cord portable anchoring device includes the first width being a greater width at each through-space opening at each of the proximal end and the distal end, sufficiently to diminish propensity of the elastic element to break at locations adjacent the through-space opening when intermittently stretched during by insertion of the protuberance or the elongated portion through the elongated slit.

In a ninth preferred embodiment as an improvement on the eighth preferred embodiment, the utensil cord portable anchoring device includes the first width at the one end being larger than at the remaining opposite end, and the first through-space having at least one of a second width or diameter at-least as large as the first width.

In a tenth preferred embodiment, the utensil cord portable anchoring device includes the elastic element at the greater width at the distal end being tapered structure tapered to the width in a direction toward the proximal end, and the greater width at the distal end being bluntly diminished structure bluntly diminished to the first width in an opposite direction toward the elongated mid-portion, such that the tapered structure facilitates movement thereof through the second through-space when intermittently anchoring, such that the bluntly diminished structure facilitates retaining the elongated element in a secured state after enveloping at-least one of the compacted cord and the free end and after insertion of the remaining opposite end through the first through-space.

In an eleventh preferred embodiment as an improvement on the tenth preferred embodiment, the utensil cord portable anchoring device includes the remaining opposite end tapering to at-least one of a reduced width and reduced diameter such that insertion thereof through the first through-space is facilitated.

In a twelfth preferred embodiment as an improvement on the eleventh preferred embodiment, the utensil cord portable anchoring device includes at-least one of the one end and the remaining end comprising an annular member secured to the intermediate mid-portion.

In a thirteenth preferred embodiment, as an improvement on the broad embodiment of the device invention above-described, the utensil cord portable anchoring device includes each of the one end and the remaining end comprising an annular member secured to the intermediate mid-portion.

In a fourteenth preferred embodiment, as an improvement on the broad embodiment of the device of the invention above-described, the utensil cord portable anchoring device includes at-least one of the end and the remaining end comprising a hook member.

In a fifteenth preferred embodiment, as an improvement on the broad embodiment of the device of the invention above-described, the utensil cord portable anchoring device includes each of the one end and the remaining end comprising an annular member secured to the intermediate mid-portion.

In a sixteenth preferred embodiment, as an improvement on the broad embodiment of the device of the invention above-described, the utensil cord portable anchoring device includes the utensil and the utensil's electrical elongated cord and electrical plug thereof.

In a seventeenth preferred embodiment, as an improvement on the broad embodiment of the device of the invention above-described, the utensil cord portable anchoring device includes at least the one structure forming at the remaining opposite end the second through-space substantially as an elongated slit extending from the remaining opposite end toward the intermediate mid-portion and the slit having opposite proximal and distal ends to the elongated slit; the proximal end has spaced-away from the intermediate mid-portion and the distal end has adjacent the intermediate mid-portion.

In an eighteenth preferred embodiment, as an improvement on the broad embodiment of the portable device of the invention above-described, the utensil cord portable anchoring device includes the one structure forming a through-space opening at each of the opposite proximal and distal ends.

In a nineteenth preferred embodiment, as an improvement on the broad embodiment of the portable device of the invention above-described, the utensil cord portable anchoring device includes the elastic element having substantially flat opposite upper and lower faces having a predetermined first width.

In a twentieth preferred embodiment, as an improvement on the nineteenth preferred embodiment, the utensil cord portable anchoring device includes the first width being a greater width at each through-space openings at each of the proximal end and the distal end, sufficiently to diminish propensity of the elastic element to break at locations adjacent the through-space opening when intermittently stretched during by insertion of the protuberance or the elongated portion through the elongated slit.

In a twenty-first preferred embodiment, as an improvement on the nineteenth preferred embodiment, the utensil cord portable anchoring device includes the first width at the one end being larger than at the remaining opposite end, and the first through-space having at least one of a second width or diameter at-least as large as the first width of the elongated mid-portion.

In a twenty-second preferred embodiment, as an improvement on the twentieth preferred embodiment, the utensil cord portable anchoring device includes the elastic element at the greater width at the distal end being tapered structure tapered to the width in a direction toward the proximal end, and the greater width at the distal end being bluntly diminished structure bluntly diminished to the first width in an opposite direction toward the elongated mid-portion, such that the tapered structure facilitates movement thereof through the second through-space when intermittently anchoring and such that the bluntly diminished structure facilitates retaining the elongated element in a secured state after enveloping at least one of the compacted cord and the electrical utensil's electrical elongated cord's free end and after insertion of the remaining opposite end through the first through-space.

In a twenty-third preferred embodiment, as an improvement on the broad embodiment of the portable device of the invention above-described, the utensil cord portable anchoring device includes the remaining opposite end tapering to at-least one of a reduced width and reduced diameter such that insertion thereof through the first through-space is facilitated.

In a twenty-fourth preferred embodiment as an improvement on any one of the preceding embodiments of the device, the optimal ranges of length, thickness, and width are as follow. The length between most distant portions of opposite ends of the elongated wrapping structure ranges broadly from about about five inches up to about twelve inches, more preferably from about six and one-half inches to about eight and one-half inches. The broad width (or diameter, if round) of the intermediate portion (apart from enlargements thereof in juxtaposition to through-space apertures/holes at opposite ends of the slit) ranges from about three-sixteenths inch to about three-quarters inch, preferably from about three-eighths inch to about one-half inch. The portable wrapping structure is preferably flat on each of opposite upper and lower faces thereof, and has a broad thickness therebetween ranging of from about one-sixty-fourth inch to about three sixteenth inch, preferably from about one-thirty-second to about one-eighth inch. Having the flat opposite upper and lower faces is preferred on the basis of being significantly easier to handle in the practice of the method of the invention and as a device provides for a tighter and more easily tightened fit in the securing thereof to a cord or compacted cord or tube or the like. For typical light-duty use to which this embodiment is directed as set-forth as the presently contemplated and researched principal intended field of use for the present invention, these broad dimensions are considered critical for optimal acceptable operativeness of the invention, and likewise for greatest and most satisfactory utility and results in use by the primary intended public, the preferred dimensions are likewise considered critical for optimal acceptable operativeness. Accordingly, these above-stated dimensions are not a matter of mere choice, the dimensions having resulted and arisen from considerable experimentation involving trial and error, including many dimensions outside of these stated ranges which proved to be at-least poor, as compared to results in the above-stated ranges.

In a twenty-fifth preferred embodiment as an improvement on the first above-described portable device the one end includes a first ring of predetermined first diameter and the remaining other end includes a second ring of predetermined second diameter interconnected by the mid-portion. Additionally, the first predetermined diameter is of smaller diameter than the second predetermined diameter, such that the first ring is passable through the second ring.

In a twenty-sixth preferred embodiment, as an improvement on the first above-described portable device, the one end includes an elastic loop of predetermined first diameter and the remaining other end includes a hook-member of predetermined second diameter interconnected by said mid-portion. Additionally, the first predetermined diameter is of smaller diameter than the second predetermined diameter, such that the elastic loop is passable through the hook-member.

In a twenty-seventh preferred embodiment, as an improvement on the first above-described portable device, the one end includes a first hook-member of predetermined first diameter and the remaining other end includes a second hook-member of predetermined second diameter interconnected by the mid-portion. Additionally, the first predetermined diameter is of smaller diameter than the second predetermined diameter, such that the first hook-member is passable through the second hook-member.

The invention may be better understood by making reference to the following figures and description thereof.

THE FIGURES

FIGS. 1 through 8 represent a series of method utilization of one preferred embodiment of the portable invention, in step-wise series in common perspective side views.

FIG. 1 aromatically illustrates on a typically garden-type hose, the initial positioning of the inventive portable device of one preferred embodiment of the invention, relative to the elongated hose, shown in perspective side view.

FIG. 2 diagrammatically illustrates on the same typically garden-type hose, an insertion step of the small end through the locking space of the opposite end of the inventive portable device of one preferred embodiment of the invention, relative to the elongated hose, shown in perspective side view.

FIG. 3 diagrammatically illustrates on the same typically garden-type hose, a third locking step of the inventive portable device of one preferred embodiment of the invention, relative to the elongated hose, shown in perspective side view.

FIG. 4 diagrammatically illustrates on the same typically garden-type hose, a fourth hose-enveloping step of the inventive portable device of one preferred embodiment of the invention, relative to the elongated hose.

FIG. 5 diagrammatically illustrates on the same typically garden-type hose, a fifth step of tightening the device around several loops of the elongated hose, shown in perspective side view.

FIG. 6 diagrammatically illustrates, on the same typically garden-type hose, a sixth step passing the hose-head (female fastener) through the expanded slit-space of the device, shown in perspective side view, shown in perspective side view.

FIG. 7 diagrammatically illustrates positioning the inserted small end around the hose adjacent the hose-head, shown in perspective side view.

FIG. 8 illustrates the final position of the anchored slit-containing small end of the device on the hose adjacent the hose-head, shown in perspective side view.

FIG. 9 diagrammatically illustrates another preferred embodiment of the inventive portable device, shown in top (or bottom, either) elevation plan view, the top view being identical to a bottom view).

FIG. 10 diagrammatically illustrates a lesser embodiment, here shown in top (or bottom, either) elevation plan view, the top view being identical to a bottom view).

FIGS. 11 through 15 diagrammatically illustrate the same several steps previously illustrated in preceding FIGS. 1 through 8, except here the preferred device being utilized on an electrical utensil and cord thereof.

FIG. 11 diagrammatically illustrates a first step of positioning the portable device relative to the elongated cord, shown in perspective top view.

FIG. 12 diagrammatically illustrates a second step of positioning the portable device to encircle the cord, ready for insertion of the small end through the slit through-space of the enlarged lock end, shown in perspective top view.

FIG. 13 diagrammatically illustrates the appearance after insertion of the small end through the slit through-space and after tightening the portable device to the locked state, shown in perspective top view.

FIG. 14 diagrammatically illustrates the appearance after an electrical utensil's (appliance's) cord-protuberance is positioned in an anchored state and position for an electrical utensil (appliance) of one particular design.

FIG. 15 diagrammatically illustrates the appearance after a protuberance or elongated portion is positioned in an anchored state and position for an electrical utensil (appliance) of one particular design, in side perspective view.

FIG. 16 diagrammatically illustrates the appearance after an elongated portion of another electrical utensil (appliance) is positioned, i.e. secured, in an anchored state of the anchored cord, in a side perspective view.

FIG. 17 diagrammatically illustrates a utensil cord portable anchoring device having one end including a first ring of predetermined first diameter and a remaining other end including a second ring of predetermined second diameter interconnected by said mid-portion, said first predetermined diameter being of smaller diameter than said second predetermined diameter, shown in top elevation view in its elongated state.

FIG. 18 diagrammatically illustrates a utensil cord portable anchoring device having one end that includes an elastic loop of predetermined first diameter and a remaining other end that includes a hook-member, shown in top elevation view in its elongated state.

FIG. 19 diagrammatically illustrates a utensil cord portable anchoring device having one end that includes a first hook-member and a remaining other end that includes a second hook-member interrrconnected by a mid-portion, shown in top elevation view in its elongated state.

DETAILED DESCRIPTION

Figure 5:
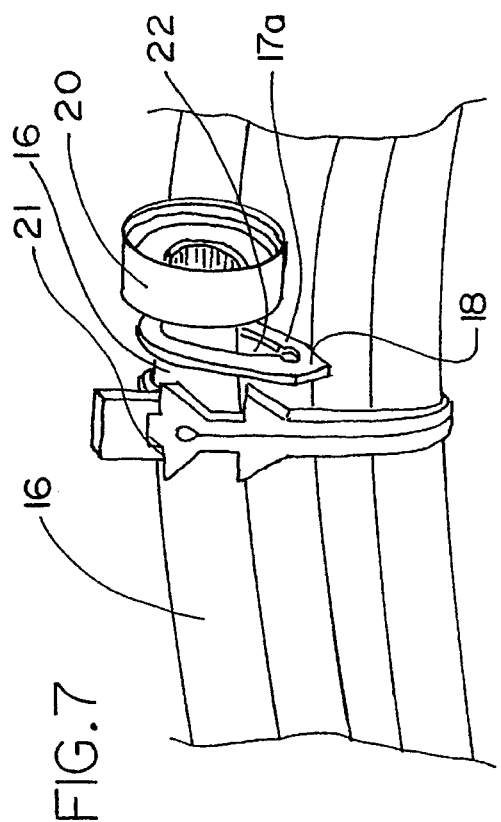

In accordance with the invention, an improved portable cord tie device provides for easy and neat storing and securing of electrical power cord or hose or rope or the like, of which a typical list follows. The device has a simple and substantially unitary (oneness) form of construction and is designed for simple and easy use and repeat use and re-use intermittently shown not actively using the utensil (appliance) or the like. Recognizing that it may come in varying sizes to accommodate either light weight or more bulky or heavy weight appliances and cords thereof and/or hoses or the like, typically the greater demand and utility is for conventional small cords as with power electric drills, electric hair driers, electric friers, etc. and/or garden hoses or the like. The portable device is elastic along at-least a portion of its elongated length and is typically and preferably cut from a conventional or modified natural or synthethic rubber typically in sheet-form, but may be woven from elastic fibers or cords or the like. The length is such that after the anchoring thereof on typically a free end of a utensil's elongated cord or hose or the like, there is sufficient elastic portion and length thereof to normally and typically be stretched to reach some convenient protuberance and/or elongated portion of the electrical utensil (appliance) normally with a minor degree of stretching along the length of the portable device, and sufficiently long as to provide for reasonable ease in opening-up the slit for wrapping the slit-forming structure about (around) the protuberance and/ or elongated portion above-noted. The portable device may be typically wrapped around a single cord or tube or hose and thereafter around several thereof prior to securing around a protuberance and/or elongated portion, or alternately initially around a plurality of sections of looped or coiled or otherwise compacted cord or tube or hose, followed by securing substantially as typically illustrated in the preceding figures. While there are preferred ranges in the thickness of the rubber of the portable device, and width thereof, and length thereof, variations for different intended uses such as light-weight hose versus heavy-weight or the like. For the previously described preferred embodiments, for example, they are typically made from pure gum, 40 durometer, noting that this material in appropriate thickness will allow the elongated portion of the portable device to be stretched and the slit to be stretched to an open state to an infinite variety of functional shapes. Typically the thickness must be enough to allow for significant elongation or stretching and folding and/or compacting and/or compressing upon entry of the lock slot of the locking structure of the enlarged end previously discussed. Color may be adapted to any of various solid and/or combined and/or alternating colors and/or patterns, as might be desired to be commercially attractive. The enlarged end or head portion must be sufficiently large to easily grasp and hold between to or more fingers, as well as to embody the through-space hole thereof sufficiently large to receive the small end and locking or barbed portion(s) therethrough.

Typical utensil(s)/apparatus(es) having cords, hose-structures or the like, to which this invention is applicable include, for example, hair driers, electric drills, electric sanders, electric vacuum cleaners, electric hedge trimmers and/or clippers, electric leaf blowers, electric snow throwers, calculators with cords, portable stereos and/or radios with cords, electric irons, electric toasters, electric toaster ovens, electric polishers and/or buffers, extension cords, drop lights or shop lights, soldering irons, electrically-driven paint sprayers, portable electric heaters, garden hoses, electric weed trimmers, electric lawn mowers, ropes, cables, portable electric fans, portable electric mixers, industrial hot wax guns, industrial hand held driers, electric hand held engraving pencils, electric wood irons, electric staplers, electric sump pumps, electric water pumps, electric hair curlers or curling irons, portable lighted make-up mirrors, dremel motors, grinders, automotive timing lights, electric routers, electric tire air pumps, and the like.

In the foregoing drawings, where common embodiments are disclosed in different drawings, the same indicia are utilized for identical features or elements thereof, and in alternate embodiments, related indicia are utilized for substantially the same features or elements previously described, to improve ease of following and understanding. Once described, description is not repeated for other embodiments, except in certain instances to improve clarity and understanding.

FIG. 1 diagrammatically illustrates on a typically garden-type hose 29, the initial positioning of the inventive portable device 17 in one preferred embodiment of the invention, relative to the elongated hose-end 16 and also illustrated (in-part) coils thereof, shown in perspective side view.

FIG. 2 diagrammatically illustrates on the same typically garden-type hose 29 and hose-end 16 thereof, an insertion step of passing the small end 18 through the locking through-space (hole) 19a of the opposite end head 19 of the inventive portable device 17 of one preferred embodiment of the invention, relative to the elongated hose end 16 and with other loops, broadly above identified as hose 29, shown in perspective side view.

FIG. 3 diagrammatically illustrates on the same typically garden-type hose 29 and hose end 16 thereof, after a third locking step of the inventive portable device of one preferred embodiment of the invention, namely having pulled the intermediate structure 17a and the barbed arrow-like locking structure 21 through the space to lock against the locking structure of the large end head 19, relative to the thereby anchored elongated hose end 16, shown in perspective side view.

FIG. 4 diagrammatically illustrates on the same typically garden-type hose 29, and a fourth hose-enveloping step of the inventive portable device of one preferred embodiment of the invention, moving the elongated intermediate structure and small end 18 in an encircling direction relative to the elongated hose.

FIG. 5 diagrammatically illustrates on the same typically garden-type hose 29, a fifth step of tightening the device around several loops 16a of the elongated hose, shown in perspective side view.

Figure 6:
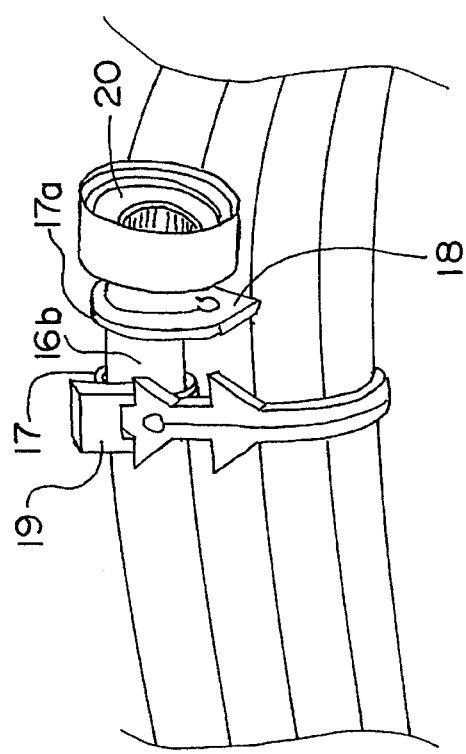

FIG. 6 diagrammatically illustrates, on the same typically garden-type hose 29, a sixth step passing the hose-head (female fastener) 20 through the expanded slit-space 22 of the structure 17a of the portable device 17, shown in perspective side view, shown in perspective side view.

Figure 7:
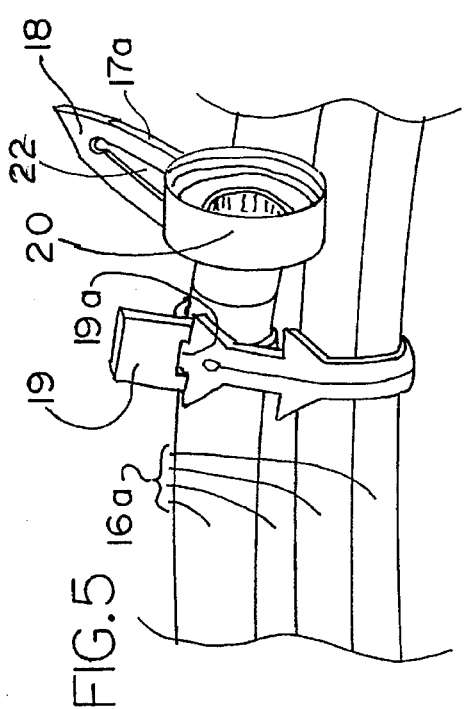

FIG. 7 diagrammatically illustrates positioning the inserted small end 18 around the hose adjacent the hose-head 20 to a seated position around the hose-end 16, shown in perspective side view.

Figure 8:
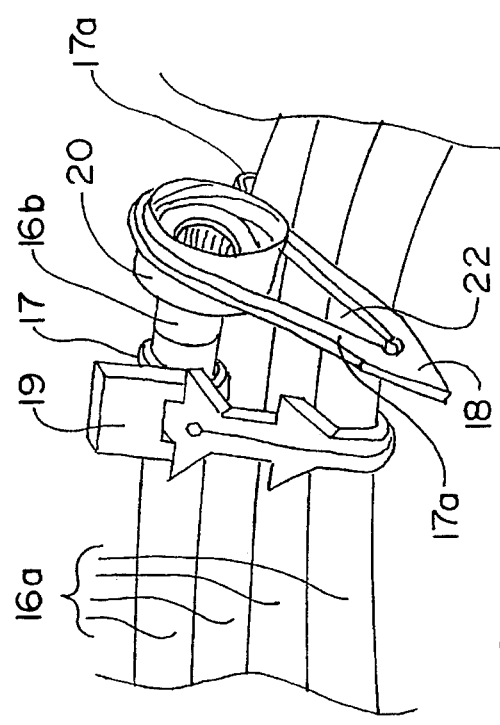

FIG. 8 diagrammatically illustrates the final position of the anchored slit-containing small end of the device on the hose end 16b at a location adjacent the hose-head 20 to a retracted state and position, shown in perspective side view.

Figures 9, 10, 11, 12, 13:
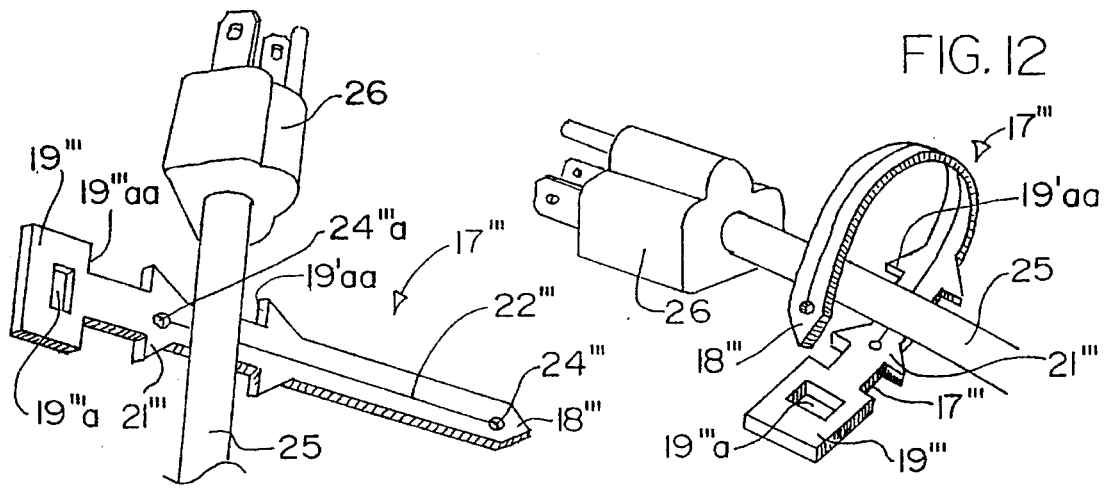

FIG. 9 diagrammatically illustrates another preferred embodiment of the inventive portable device 17', shown in top (or bottom, either) elevation plan view, the top view being identical to a bottom view, illustrating elements previously described. Additionally illustrated are the enlarged widths 23 and 23a respectively, adjacent the large holes 24 and 24a located at opposite terminal ends of the slit 22'. Also illustrated is the gradually angularly increasing width 19'*aa* on each side of the structure 17'*a* at the head 19'. Also, the barbed ratchet-like locking structures 21' and 21'*a* of one-way ratching is shown. It is noted that these barbed ratchet-like structures are also however flexible and/or elastic and merely deter but do not prevent eventual threading of them reversably backward to achieve loosening and removal from the anchored cord or hose or the like.

FIG. 10 diagrammatically illustrates a lesser but other preferred embodiment 17", here shown in top (or bottom, either) elevation plan view, the top view being identical to a bottom view). In this embodiment, the barbed structure is not of a ratchet design, being angular structures 21"*aa'* and 21*aa* in each of opposite directions.

FIGS. 11 through 15 diagrammatically illustrate the same several steps previously illustrated in preceding FIGS. 1 through 8, except here the preferred device being utilized on different electrical utensil electrical cord free-end 25 thereof having male plug 26.

FIG. 11 diagrammatically illustrates a first step of positioning the portable electric drill device 27*a* relative to the elongated cord 30*a*, shown in perspective top view. The stretchable structure 17*a* is positioned preparatory to encircling the cord 25 and insertion of the small end 18''' next through the through-space hole 19''' of head 19'''.

FIG. 12 diagrammatically illustrates a second step of positioning the portable device 17''' and small end 18 to encircle the cord 25 preparatory to insert the small end into the through-space hole 19'''*a* of the enlarged lock end head 19''', shown in perspective top view.

FIG. 13 diagrammatically illustrates the appearance after insertion of the small end 19''' through the slit through-space hole 19'''*a* and after tightening the portable device 17''' to the locked position and state, shown in perspective top view.

FIG. 14 diagrammatically illustrates the appearance after an electrical utensil's (appliance's) cord-protuberance 28*a* is positioned within space 22'''*b* and in an anchoring state and position encircled by seated structure 17*c* for an electrical drill utensil (appliance) 27*a* of one particular design.

FIG. 15 diagrammatically illustrates the appearance after a protuberance or elongated portion 28*b* is positioned within space 22'''*b* and in an anchoring state and position encircled by seated structure 17*c* for an electrical hair-blower utensil (appliance) 27*b* of one particular design, in side perspective view.

FIG. 16 diagrammatically illustrates the appearance after an elongated portion 28*c* of another electrical hair-blower utensil (appliance) 27*c* is positioned, i.e. secured, in an anchoring state of the anchored cord 30*c*, in a side perspective view.

FIG. 17 diagrammatically illustrates a utensil cord portable anchoring device 17*x* having one end including a first ring 18*x* of small predetermined first diameter and a remaining other opposite end including a second ring 19*x* of larger predetermined second diameter interconnected by said elastic mid-portion 17*xa*, said first predetermined diameter being of smaller diameter than said second predetermined diameter, shown in top elevation view in its elongated (reteracted) state.

FIG. 18 diagrammatically illustrates a utensil cord portable anchoring device 17*y* having one end that includes a typically small elastic loop 18*y* of predetermined first diameter and a remaining other opposite end that includes a hook-member 19*y* of typically larger second predetermined diameter as compared to the first diameter, interconnected by elastic mid-portion 17*ya* shown in top elevation view in its elongated (retracted) state.

FIG. 19 diagrammatically illustrates a utensil cord portable anchoring device 17*z* having one end that includes a first hook-member 18*z* and a remaining opposite other end that includes a second hook-member 19*z* interconnected by a mid-portion 17*za*, shown in top elevation view in its elongated (retracted) state.

It is within the scope and spirit of the present invention to make modifications and/variations and/or substitution of equivalents within the skill of an ordinary artisan.

I claim:

1. A method for intermittently securably anchoring on an electrical utensil having at-least one of a protuberance and an elongated portion, an electrical utensil's electrical elongated cord having a free end inclusive of an electrical plug, the method comprising in combination: a) first positioning the electrical elongated cord in an unanchored compacted state and position and the electrical plug thereof; b) thereafter employing a portable wrapping means for intermittently securing said utensil's electrical elongated cord and said free-end to said at-least one of said protuberance and said elongated portion of the electrical utensil, when said wrapping means includes an elongated elastic element having at-least one structure providing through-space through each of one end of the elongated elastic element and a remaining opposite end of the elongated elastic element and an intermediate mid-portion between said one end and said remaining opposite end, and when the remaining opposite end and said mid-portion are serially insertable through the through-space at said one end, said employing including wrapping the elongated elastic element circumscribingly around at-least one of the unanchored compacted cord and the free end; c) serially inserting said remaining opposite end and said intermediate mid-portion through said through-space at said one end sufficiently to form a loop having a circumference around at-least one of the unanchored compacted cord and the free end, d) tightening the elongated elastic element sufficiently to reduce said circumference, and e) thereafter intermittently anchoring the remaining opposite end securably around at-least one of said protuberance and said elongated portion such that said protuberance or said elongated portion is positioned within said through-space at said remaining opposite end.

* * * * *